(12) United States Patent
Wang et al.

(10) Patent No.: US 9,016,678 B2
(45) Date of Patent: Apr. 28, 2015

(54) DUAL-TOGGLE-TYPE MOBILE PLATFORM STRUCTURE

(75) Inventors: Shih-Ming Wang, Taoyuan County (TW); Yan-Ting Chen, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 446 days.

(21) Appl. No.: 13/455,424

(22) Filed: Apr. 25, 2012

(65) Prior Publication Data

US 2013/0207330 A1    Aug. 15, 2013

(30) Foreign Application Priority Data

Feb. 10, 2012  (TW) .............................. 101104341 A (51) Int. Cl.
*B23Q 1/44* (2006.01)
*B23Q 5/40* (2006.01)

(52) U.S. Cl.
CPC ... *B23Q 1/44* (2013.01); *B23Q 5/40* (2013.01)

(58) Field of Classification Search
USPC .................................................. 269/55–57
See application file for complete search history.

(56) References Cited

U.S. PATENT DOCUMENTS

| 7,213,316 | B2* | 5/2007 | Kato .............................. 29/33 P |
| 2002/0060386 | A1* | 5/2002 | Konieczny ...................... 269/56 |
| 2007/0152391 | A1* | 7/2007 | Chitayat ......................... 269/55 |
| 2010/0194013 | A1* | 8/2010 | Hall et al. ....................... 269/56 |
| 2012/0102731 | A1* | 5/2012 | Guo et al. ....................... 29/832 |
| 2014/0053985 | A1* | 2/2014 | Zhang et al. ................. 156/538 |

* cited by examiner

*Primary Examiner* — Lee D Wilson
*Assistant Examiner* — Henry Hong
(74) *Attorney, Agent, or Firm* — Rosenberg, Klein & Lee (57) ABSTRACT

A dual-toggle-type mobile platform structure comprises a base, a motor, a ball screw, a linear slide, a first toggle link rod, a second toggle link rod, a guide rail and a work platform. The second toggle link rod has an end coupled to the first toggle link rod and the other end coupled to the work platform. A connecting position of the second toggle link rod and the first toggle link rod is designed with an optimal configuration to provide a smaller footprint than the conventional dual-toggle-type mobile platform structure, and the advantages of a larger stroke of the work platform and a smaller feed resolution difference, and the structure serves as a reference of an optimal manufacturing area.

5 Claims, 6 Drawing Sheets

DUAL-TOGGLE-TYPE MOBILE PLATFORM STRUCTURE

CROSS-REFERENCE TO RELATED APPLICATIONS

This non-provisional application claims priority under 35 U.S.C. §119(a) on Patent Application No(s). 101104341 filed in Taiwan, R.O.C. on Feb. 10, 2012, the entire contents of which are hereby incorporated by reference.

BACKGROUND OF THE INVENTION

1. Field of the Invention

The present invention relates to the area of mobile platforms used in micro machine tools, in particular to a dual-toggle-type mobile platform structure with an optimal design, a small footprint, a large stroke and a small feed resolution difference.

2. Description of the Related Art

Precision manufacturing machinery is an essential basis for industrial developments as well as a major key for industrial upgrades. Taiwan is one of the major global machine tools producing countries, and faces a trend of miniaturizing various kinds of electronic, communication, optic, medical, and related products, and a strict requirement of manufacturing precisions, so that machine tools for the manufacture must be upgraded constantly to meet different industrial requirements.

In general, the requirement of machine tools is nothing more than the manufacturing precision, and major errors affecting the precision of the machine tools are mainly divided into the following four types:

(1) Geometric errors mainly caused by the manufacture and installation of the machine tools.

(2) Kinematic errors mainly caused by a defective transmission mechanism.

(3) Thermal induced errors mainly caused by an increased temperature of the main shaft or a change of ambient temperature.

(4) Dynamic errors mainly caused by dynamic loads.

In general, a mobile platform of a serial mobile platform structure used for manufacturing has a feed resolution varied with the precision of a driving system (or servo system) of a server, and thus the feed resolution of the mobile platform is limited by the precision of the servo system, and a toggle-type mobile platform structure drives the mobile platform by one or more link rods and amplifies the feed resolution of the servo system by a trigonometric and geometric relation between the link rods, so to have the advantages of a low cost and a high precision, and the feed resolution of the mobile platform is no longer limited by the precision of the servo system.

Figure 1:
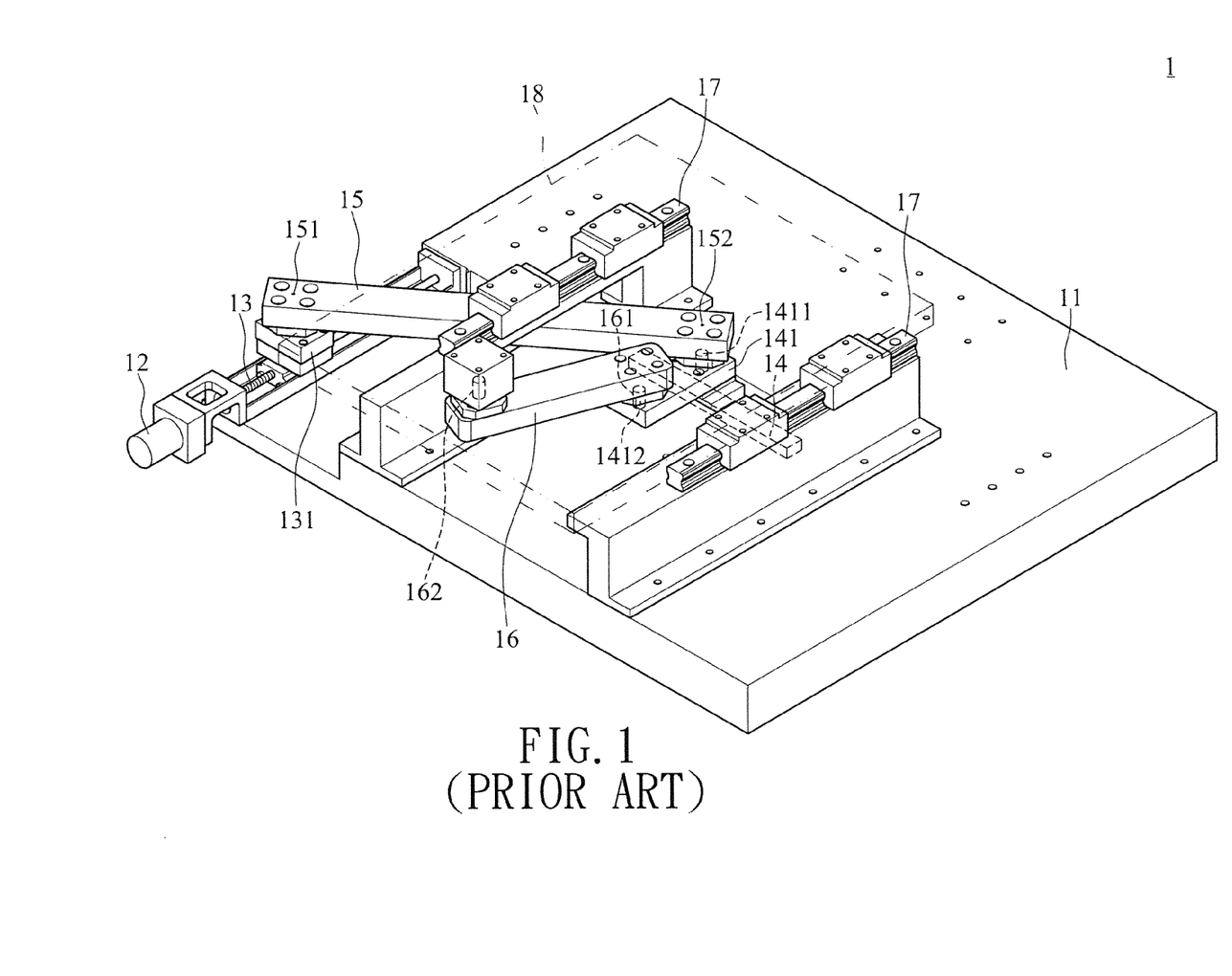
FIG. 1 is a schematic view of a conventional dual-toggle-type mobile platform structure.

In the motion of a single-toggle-type mobile platform, the feed resolution of the mobile platform changes with the angle of toggle link rods, and the feed resolution varies with a big difference, so that a dual-toggle-type mobile platform comprising two sets of serially connected single-toggle-type mobile platforms can reduce the difference of the feed resolutions of the mobile platform significantly. Compared with the structure of a single-toggle-type mobile platform or a serial mobile platform, the dual-toggle-type mobile platform can meet the low-cost and high-precision requirements. With reference to FIG. 1 for a schematic view of the structure of a conventional dual-toggle-type mobile platform, the dual-toggle-type mobile platform 1 comprises a base 11, a motor 12, a ball screw 13, a linear slide 14, a first toggle link rod 15, a second toggle link rod 16, a guide rail 17 and a work platform 18. Wherein, the motor 12 is installed on a side of the base 11; the ball screw 13 has an end coupled to the motor 12 and a screw platform 131 disposed on the ball screw 13; the linear slide 14 is installed on the base 11 and disposed perpendicular to the ball screw 13 and has a moving block 141 disposed on the linear slide 14, and a first fixed connecting point 1411 and a second fixed connecting point 1412 defined on the moving block 141, and wherein the first fixed connecting point 1411 and the second fixed connecting point 1412 are arranged next to one another can be connected to define a connecting line which is perpendicular to the linear slide 14. The first toggle link rod 15 has a first connecting portion 151 and a second connecting portion 152, wherein the first connecting portion 151 is coupled to the screw platform 131, and the second connecting portion 152 is coupled to the first fixed connecting point 1411. The second toggle link rod 16 has a third connecting portion 161 and a fourth connecting portion 162, wherein the third connecting portion 161 is coupled to the second fixed connecting point 1412, and a pair of the guide rails 17 are disposed on the base 11 and separately perpendicular to the linear slide 14 and parallel to the ball screw 13. The work platform 18 is movably installed on the guide rail 17 and coupled to the fourth connecting portion 162. The working angles of the first toggle link rod 15 and the second toggle link rod 16 are complementary to each other to maintain a mild change of the feed resolution of the motor 12, so as to provide the advantage of a small feed resolution difference.

In the mechanical design of a single-toggle-type mobile platform or a dual-toggle-type mobile platform, the length of the toggle link rods must be increased, so that the work platform 18 can meet the working stroke requirement, but the length of the toggle link rods is a main factor affecting the overall size of a machine. Since different lengths of the toggle link rods will affect the overall footprint of the machine, the increased length of the toggle link rods can provide a larger displacement in a fixed working angle range, yet the distance between the ball screw 13 and the mobile platform 18 is affected, so that the size of the base 11 will be increased. Compared with the serial mobile platform structure capable of producing the same working stroke, the volume and footprint of this machine is increased by approximately 2.5 to 3 times. It is an important subject for designers and manufacturers of the related industry to design a dual-toggle-type mobile platform structure that can meet the requirements of small space, large stroke, and small resolution difference.

In view of the problems of the conventional mobile platforms, the inventor of the present invention develops a dual-toggle-type mobile platform structure that changes the way of connecting the toggle link rods and adopts an optimal configuration for the mechanical design, so as to provide a mobile platform having the advantages of small footprint, large stroke and small resolution difference. Actual practices of the novel dual-toggle-type mobile platform structure indicate that its performance can be applied for micro manufacture in the future.

SUMMARY OF THE INVENTION

Therefore, it is a primary objective of the present invention to provide a dual-toggle-type mobile platform structure that changes the connecting position between a first toggle link rod and a second toggle link rod, not only using the first toggle link rod to drive the second toggle link rod to move, but also increase the stroke of a work platform.

A secondary objective of the present invention is to provide a dual-toggle-type mobile platform structure that obtains the length ratio of the two toggle link rods from experiments, such that the stroke of the work platform can be increased, and the overall footprint can be reduced effectively, and the feed resolution difference of the work platform can be minimized to reduce the total volume and footprint of the machine, so as to enhance the practicability and applicability of the product significantly.

Another objective of the present invention is to provide a dual-toggle-type mobile platform structure further comprising an optical measuring device for measuring a displacement of a work platform accurately.

To achieve the foregoing objectives, the present invention provides a dual-toggle-type mobile platform structure, comprising: a base; a motor, installed on a side of the base; a ball screw, installed on the base, and having an end coupled to the motor, and a screw platform formed on the ball screw; a linear slide, disposed on the base and perpendicular to the ball screw, and having a moving block disposed on the linear slide; a first toggle link rod is a rod with a length $L_1$ and having a first connecting portion and a second connecting portion, and the first connecting portion is coupled to the screw platform, and the second connecting portion is coupled to the moving block, and the first toggle link rod having a fixed connecting point, and the distance between the fixed connecting point and the second connecting portion is A, and the first toggle link rod having a working angle range of $[\theta_{1a}, \theta_{1b}]$, and $\theta_{1a}$ referring to a start angle of the first toggle link rod, and $\theta_{1b}$ referring to an end angle of the first toggle link rod; a second toggle link rod is a rod with a length $L_2$ and having a third connecting portion and a fourth connecting portion, and the third connecting portion is coupled to the fixed connecting point, and the second toggle link rod having a working angle range of $[\theta_{2a}, \theta_{2b}]$, and $\theta_{2a}$ referring to a start angle of the second toggle link rod, and $\theta_{2b}$ referring to an end angle of the second toggle link rod; a guide rail, installed on the base and disposed perpendicular to the linear slide and parallel to the ball screw; and a work platform, movably installed on the guide rail and coupled to the fourth connecting portion, and the work platform has a stroke of $D_W$, and $$D_W = |L_2(\sin\theta_{2b} - \sin\theta_{2a}) + A(\cos\theta_{1b} - \cos\theta_{1a})|.$$

Wherein, the motor is one selected from the collection of a step motor and a servomotor.

Wherein, both of the first toggle link rod and the second toggle link rod have a working angle range smaller than 90 degrees. In other words, $|\theta_{1a} - \theta_{1b}| < 90°$, and $|\theta_{2a} - \theta_{2b}| < 90°$.

By changing the position of the fixed connecting point of the first toggle link rod and the second toggle link rod, the stroke of the work platform can be increased without increasing the length of the first toggle link rod or the footprint, or causing a too-large feed resolution difference. If the length of the first toggle link rod is decreased significantly while maintaining the same stroke, the footprint can be reduced. Compared with the conventional dual-toggle-type mobile platform, the work platform of the dual-toggle-type mobile platform of the present invention has the advantages of a smaller feed resolution difference, a smaller space and a greater stroke. Wherein, the fixed connecting point must have a distance a from the second connecting portion, and a must be smaller than $L_1 - L_2$.

The greater the distance of the fixed connecting point from the second connecting portion of the first toggle link rod, the greater is the value a, and the greater is the total displacement of the work platform. It is noteworthy to point out that if the distance a between the fixed connecting point and the second connecting portion is greater than $L_1 - L_2$, then the footprint will exceed the working range of the first toggle link rod after the second toggle link rod is installed. Although the stroke and displacement of the mobile platform are increased, yet the footprint is increased and more space is wasted.

Wherein, the fourth connecting portion moving path and the screw platform moving path have an interval h apart from each other, and the second toggle link rod has the end angle $$\theta_{2b} = \cos^{-1}\left[\frac{(L_1 - a) \times \sin\theta_{1b} - h}{L_2}\right],$$

and h not only relates to the lengths of the first toggle link rod and the second toggle link rod and the working angle range, but also relates closely with the footprint of the present invention.

In a preferred embodiment, the dual-toggle-type mobile platform structure of the present invention further comprises an optical measuring device installed on a side of the guide rail for measuring a displacement of the work platform and serving as a basis for controlling the feed rate of the motor to drive the ball screw.

DETAILED DESCRIPTION OF THE PREFERRED EMBODIMENTS

The technical contents of the present invention will become apparent with the detailed description of preferred embodiments and the illustration of related drawings as follows.

With reference to FIGS. 2 to 5 for a schematic view and a top view of a structure, and schematic views of the moving status of each toggle link rod in accordance with a preferred embodiment of the present invention respectively, the dual-toggle-type mobile platform 2 comprises a base 21, a motor 22, a ball screw 23, a linear slide 24, a first toggle link rod 25, a second toggle link rod 26, a guide rail 27 and a work platform 28.

Wherein, the base 21 is made of a metal plate material, and has a first containing groove 211 formed on a side of the base 21, a second containing groove 212 formed at a central position of the base 21, and a plurality of fixing holes 213 formed on a surface of the base 21.

The motor 22 is one selected from the collection of a step motor and a servomotor, and installed on a side of the base 21.

The ball screw 23 is installed in the first containing groove 211 of the base 21, and an end of the ball screw 23 is coupled to the motor 22, and the ball screw 23 has a screw platform 231 disposed thereon. When the motor 22 is operated, the ball screw 23 is driven to rotate clockwise or counterclockwise, so that the screw platform 231 can be moved linearly and reciprocally on the ball screw 23.

The linear slide 24 is installed in the second containing groove 212 of the base 21 and disposed perpendicular to the ball screw 23. The linear slide 24 has a moving block 241 disposed thereon and moved linearly and reciprocally on the linear slide 24.

The first toggle link rod 25 is a rod with a length $L_1$, and a first connecting portion 251 and a second connecting portion 252 are disposed at both ends of the first toggle link rod 25 respectively, wherein the first connecting portion 251 is coupled to the screw platform 231, and the second connecting portion 252 is coupled to the moving block 241, and the first toggle link rod 25 has a fixed connecting point 253, and the fixed connecting point 253 and the second connecting portion 252 are situated with a distance a apart from each other, and the first toggle link rod 25 has a working angle range of $[\theta_{1a}, \theta_{1b}]$, refers to a start angle of the first toggle link rod 25, and $\theta_{1b}$ refers to an end angle of the first toggle link rod 25. It is noteworthy to point out that the first toggle link rod has a working angle range smaller than 90 degrees; in other words, $|\theta_{1a}-\theta_{1b}|<90°$.

The second toggle link rod 26 is a rod with a length $L_2$, and a third connecting portion 261 and a fourth connecting portion 262 are disposed at both ends of the second toggle link rod 26 respectively, and the third connecting portion 261 is coupled to the fixed connecting point 253, and the second toggle link rod 26 has a working angle range of $[\theta_{2a}, \theta_{2b}]$, and $\theta_{2a}$ refers to a start angle of the second toggle link rod 26, and $\theta_{2b}$ refers to an end angle of the second toggle link rod 26. It is noteworthy to point out that the second toggle link rod has a working angle range smaller than 90 degrees; in other words, $|\theta_{2a}-\theta_{2b}|<90°$, and the fixed connecting point 253 is situated at a position with a distance A of from the second connecting portion 252, and a must be smaller than $L_1-L_2$.

A pair of guide rails 27 are installed on the base 21 and disposed within the moving range of the corresponding work platforms 28. The guide rails 27 include a pair of support stands 271, a pair of eagle-shaped slides 272 and a plurality of eagle-shaped slide blocks 273, wherein the pair of support stands 271 are secured into the fixing holes 213 of the base 21, and one of the support stands 271 is disposed across the top of the first toggle link rod 25, and the pair of eagle-shaped slides 272 are installed on the pair of support stands 271, and the eagle-shaped slide blocks 273 are movably and respectively installed on the pair of eagle-shaped slides 272 for limiting the position of the linear movement, and the guide rails 27 are installed perpendicular to the linear slide 24 and parallel to the ball screw 23.

The work platform 28 is disposed on the eagle-shaped slide blocks 273 and capable of moving linearly and reciprocally on the pair of eagle-shaped slides 272, and the bottom surface of the work platform 28 is coupled to the fourth connecting portion 262, and the work platform 28 has a stroke $D_W$, and $D_W=|L_2(\sin\theta_{2b}-\sin\theta_{2a})+A(\cos\theta_{1b}-\cos\theta_{1a})|$. In addition, the fourth connecting portion moving path and the screw platform moving path are disposed with an interval h apart from each other, and the second toggle link rod 26 has an end angle $$\theta_{2b} = \cos^{-1}\left[\frac{(L_1 - A) \times \sin\theta_{1b} - h}{L_2}\right].$$

Obviously, the value of h not only relates to the length of the first toggle link rod 25, the second toggle link rod 26 and the working angle range, but also relates closely to the footprint of the present invention.

Figure 2:
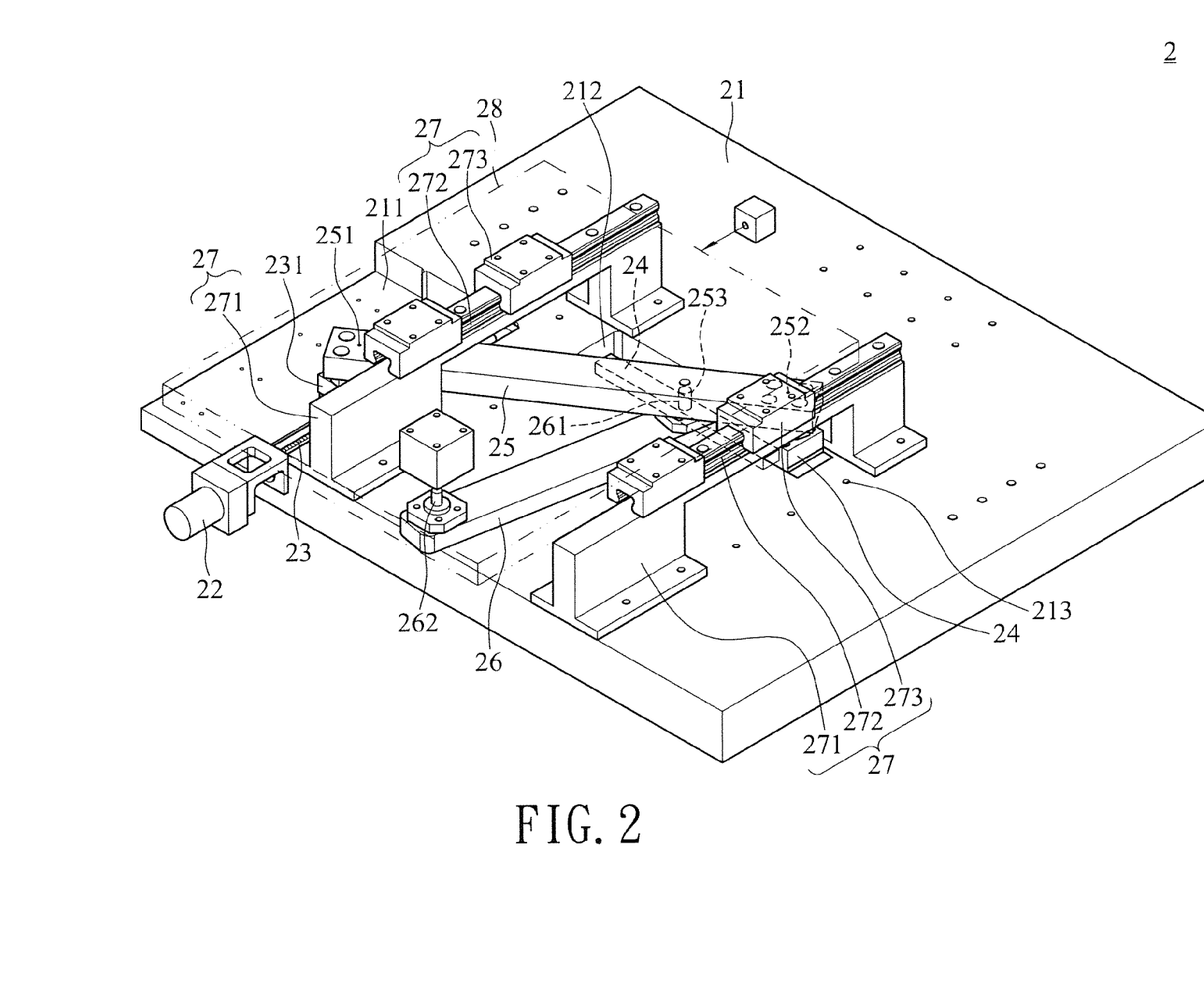
FIG. 2 is a schematic view of a structure in accordance a preferred embodiment of the present invention.
Figure 3:
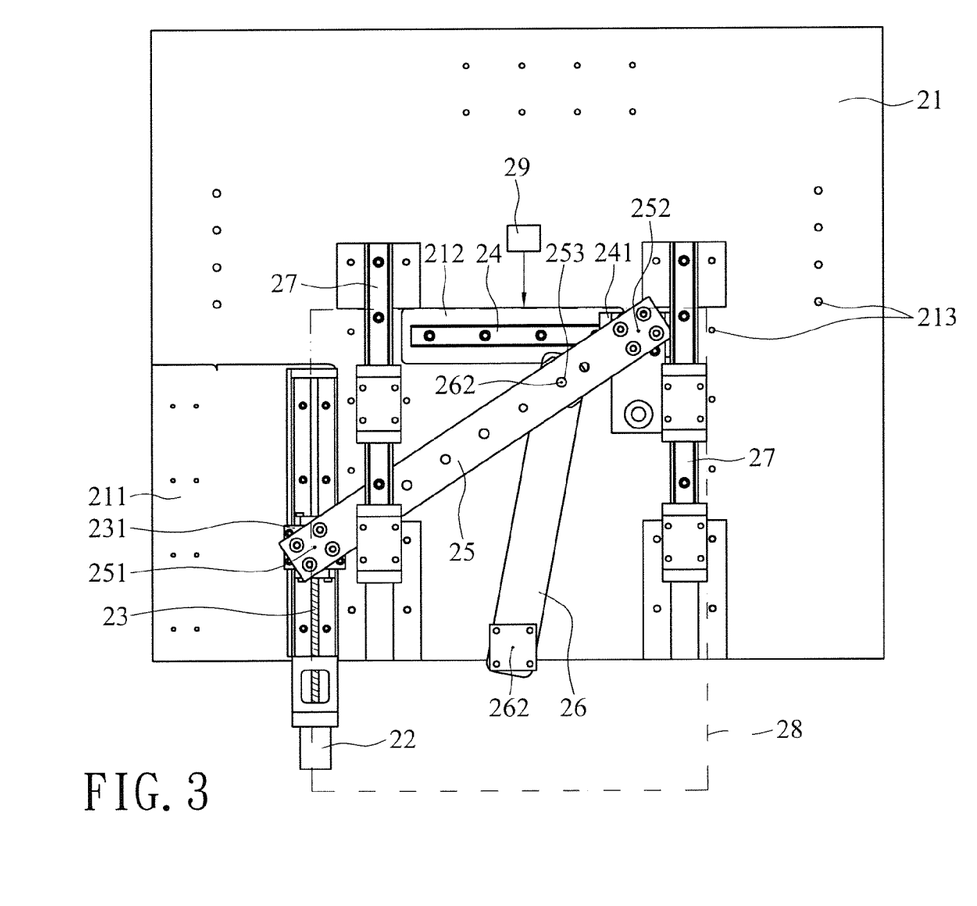
FIG. 3 is a top view of a structure in accordance a preferred embodiment of the present invention.
Figure 4:
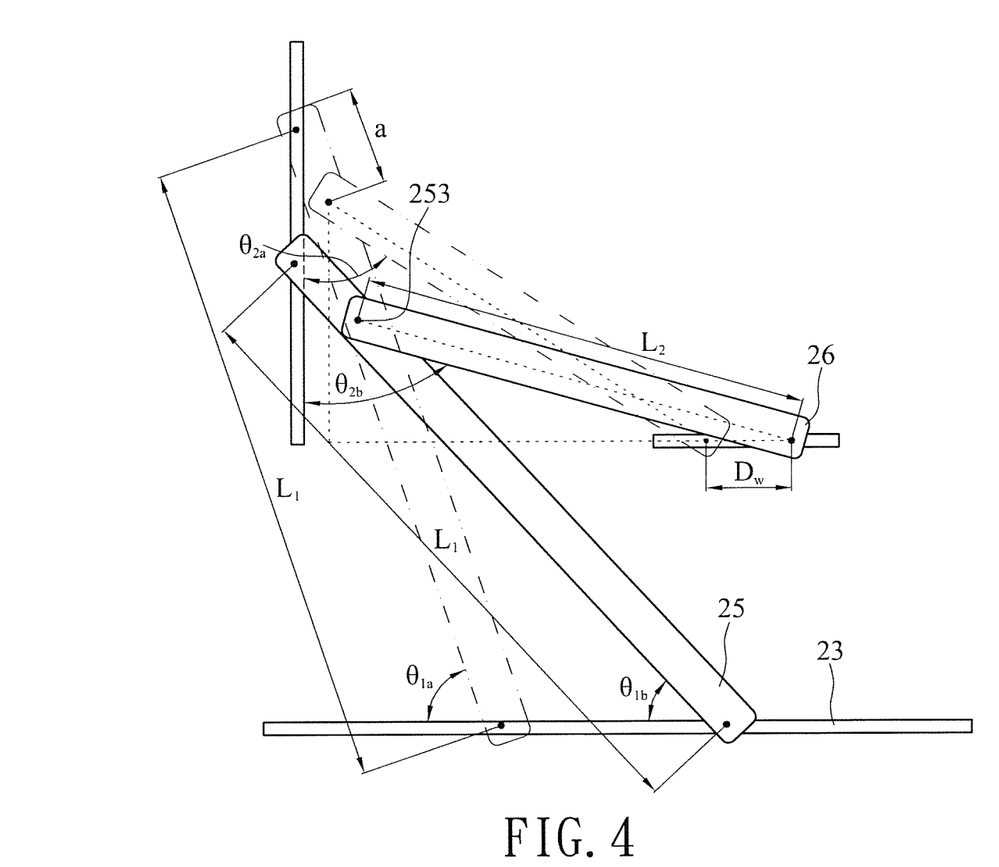
FIG. 4 is a first schematic view of the moving status of each toggle link rod in accordance a preferred embodiment of the present invention.
Figure 5:
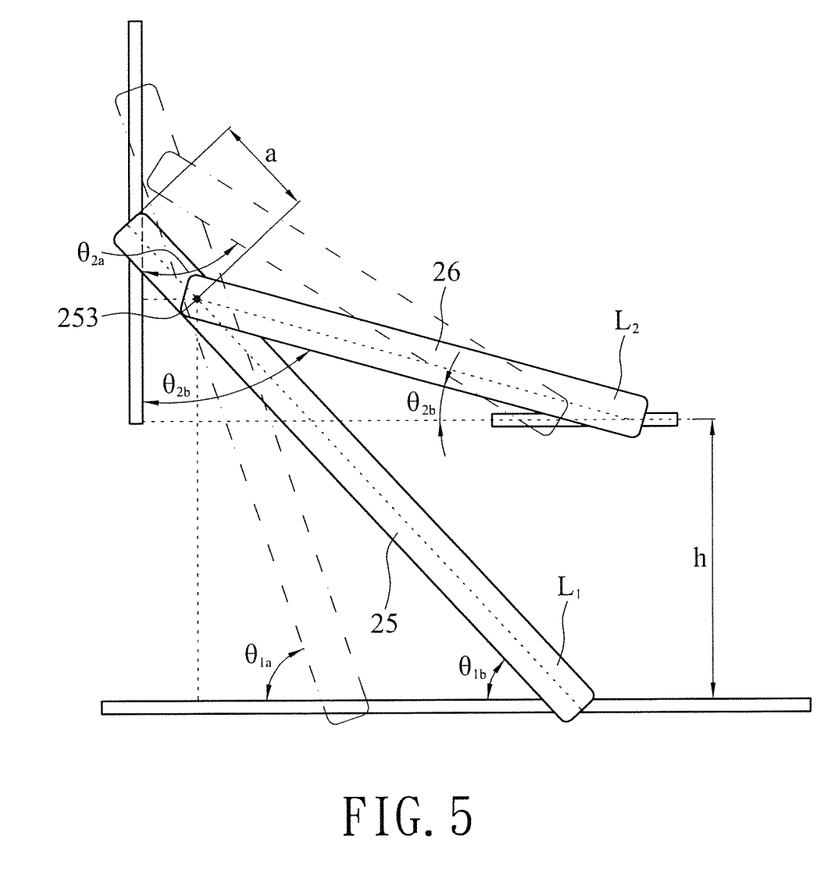
FIG. 5 is a second schematic view of the moving status of each toggle link rod in accordance a preferred embodiment of the present invention.

In addition, the dual-toggle-type mobile platform structure 2 of the present invention further comprises an optical measuring device 29 installed on a side of the guide rail 27 for measuring a displacement of the work platform 28 and serving as a basis of controlling the feed rate of the motor 22 to drive the ball screw 23.

Figure 6:
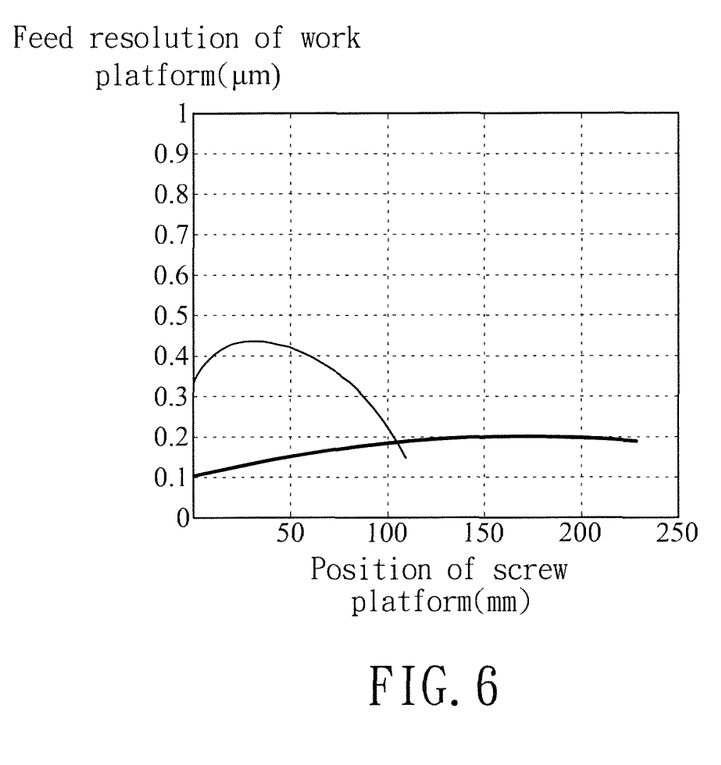
FIG. 6 is a graph of comparing the feed resolutions between a preferred embodiment of the present invention and a prior art.

With reference to FIG. 6 for a graph of comparing the feed resolutions between a preferred embodiment of the present invention and a prior art and together with FIGS. 1 to 5, the bold line in the figures refers to the linearity of the position of the screw platform 231 of the dual-toggle-type mobile platform 2 and the feed resolution of the work platform 28 in accordance with a preferred embodiment of the present invention, and the fine line refers to the linearity of the position of the screw platform 131 of a conventional dual-toggle-type mobile platform 1 and the feed resolution of the work platform 18. According to the practical applications, the comparisons of two types of dual toggle type mobile platform 1, 2 are shown in the following table. Under the same stroke and same footprint, the dual toggle type mobile platform 1 of the present invention achieves smaller average feed resolution of the work platform than the conventional dual toggle type mobile platform 2.

| | Conventional dual-toggle-type mobile platform | Dual-toggle-type mobile platform of the present invention |
|---|---|---|
| First toggle link rod length (mm) | 210 | 210 |
| Second toggle link rod length (mm) | 55 | 174 |
| Working angle of the first toggle link rod (°) | 85°~50° | 85°~50° |
| Working angle of the second toggle link rod (°) | 15°~85° | 50°~67° |
| Position of the fixed connecting point (mm) | 0 | 25 |
| Total stroke of the work platform (mm) | 40 | 40 |
| Average feed resolution of the work platform (μm) | 0.34 | 0.17 |

The table shows that the conventional dual-toggle-type mechanical platform 1 with the configuration of link rods has the same stroke of the work platform 18 as the stroke of the dual-toggle-type mobile platform 2 of the present invention, but the working angle range of the second toggle link rod 16 is also increased, so that the change of speed and acceleration of the work platform 18 is significant during the moving process, and the maximum and minimum feed resolutions of the work platform 18 have a difference up to five or more times, and the average feed resolution is also up to 0.34 μm. On the other hand, the dual-toggle-type mobile platform 2 of the present invention changes the position of the fixed connecting point 253 between the first toggle link rod 25 and the second toggle link rod 26, so that the horizontal displacement $A(\cos\theta_{1b}-\cos\theta_{1a})$ of the fixed connecting point 253 increases the displacement of the work platform 28, during the process of moving the screw platform 231, and the working angle range of the second toggle link rod 26 becomes smaller. Relatively, the feed resolution of the work platform 28 is also better than that of the configuration of the conventional dual-toggle-type mobile platform 1. Therefore, the invention can achieve the optimal configuration effect, and designers can base on this principle for their design. Regardless of increasing or decreasing the scale, this principle can be used to improve the flexible space for future designs.

In summation, the aforementioned analysis and comparison show that the present invention can provide an optimal design of the overall configuration by changing the position of the fixed connecting point 253 between the first toggle link rod 25 and the second toggle link rod 26. As a result, the stroke of the work platform 28 can be increased significantly while maintaining the lengths of the first toggle link rod 25 and the second toggle link rod 26 unchanged or maintaining the footprint unchanged. The length of the first toggle link rod 25 can be shortened effectively to reduce the footprint, while maintaining the same stroke and minimizing the change of resolution to a more stable condition. A better feed resolution of the work platform 28 can be achieved with the same conditions or parameters of the conventional dual-toggle-type mobile platform. In summation, the dual-toggle-type mobile platform 2 of the present invention has the advantages of small footprint, large stroke and small feed resolution difference, and the design of the dual-toggle-type mobile platform can be applied to three axes of a micro machine tool to improve the optimal configuration of the dual-toggle-type micro machine tools effectively.

While the invention has been described by means of specific embodiments, numerous modifications and variations could be made thereto by those skilled in the art without departing from the scope and spirit of the invention set forth in the claims.

What is claimed is:

1. A dual-toggle-type mobile platform structure, comprising:
   a base;
   a motor, installed on a side of the base;
   a ball screw, installed on the base, and having an end coupled to the motor, and a screw platform formed on the ball screw;
   a linear slide, disposed on the base and perpendicular to the ball screw, and having a moving block disposed on the linear slide;
   a first toggle link rod, being a rod with a length $L_1$ and having a first connecting portion and a second connecting portion, and the first connecting portion being coupled to the screw platform, and the second connecting portion being coupled to the moving block, and the first toggle link rod having a fixed connecting point, and a distance between the fixed connecting point and the second connecting portion being A, and the first toggle link rod having a working angle range of $[\theta_{1a}, \theta_{1b}]$, and $\theta_{1a}$ referring to a start angle of the first toggle link rod, and $\theta_{1b}$ referring to an end angle of the first toggle link rod;
   a second toggle link rod, being a rod with a length $L_2$ and having a third connecting portion and a fourth connecting portion, and the third connecting portion being coupled to the fixed connecting point, and the second toggle link rod having a working angle range of $[\theta_{2a}, \theta_{2b}]$, and $\theta_{2a}$ referring to a start angle of the second toggle link rod, and $\theta_{2b}$ referring to an end angle of the second toggle link rod;
   a guide rail, installed on the base and disposed perpendicular to the linear slide and parallel to the ball screw; and
   a work platform, movably installed on the guide rail and coupled to the fourth connecting portion, and the work platform has a stroke of $D_W$, and $D_W = |L_2(\sin\theta_{2b} - \sin\theta_{2a}) + A(\cos\theta_{1b} - \cos\theta_{1a})|$, wherein the working angle range $[\theta_{1a}, \theta_{1b}]$ of the first toggle link rod is 85°~50°, and the working angle range $[\theta_{2a}, \theta_{2b}]$ of the second toggle link rod is 50°~47°, and the first toggle link rod has a length $L_1$ equal to 210 length units, and the second toggle link rod has a length $L_2$ equal to 174 length units, and the distance a between the fixed connecting point and the second connecting portion is equal to 25 length units, so that the work platform has a stroke $D_W$=40 length units.

2. The dual-toggle-type mobile platform structure of claim 1, wherein the length unit is 1 mm.

3. The dual-toggle-type mobile platform structure of claim 1, wherein the fourth connecting portion moving path and the screw platform moving path have an interval h apart from each other, and the second toggle link rod has the end angle $$\theta_{2b} = \cos^{-1}\left[\frac{(L_1 - A) \times \sin\theta_{1b} - h}{L_2}\right].$$

4. The dual-toggle-type mobile platform structure of claim 1, wherein the motor is one selected from a collection of a step motor and a servomotor.

5. The dual-toggle-type mobile platform structure of claim 1, further comprising an optical measuring device installed on a side of the guide rail for measuring a displacement of the work platform.

* * * * *